United States Patent Office 2,874,613
Patented Feb. 24, 1959

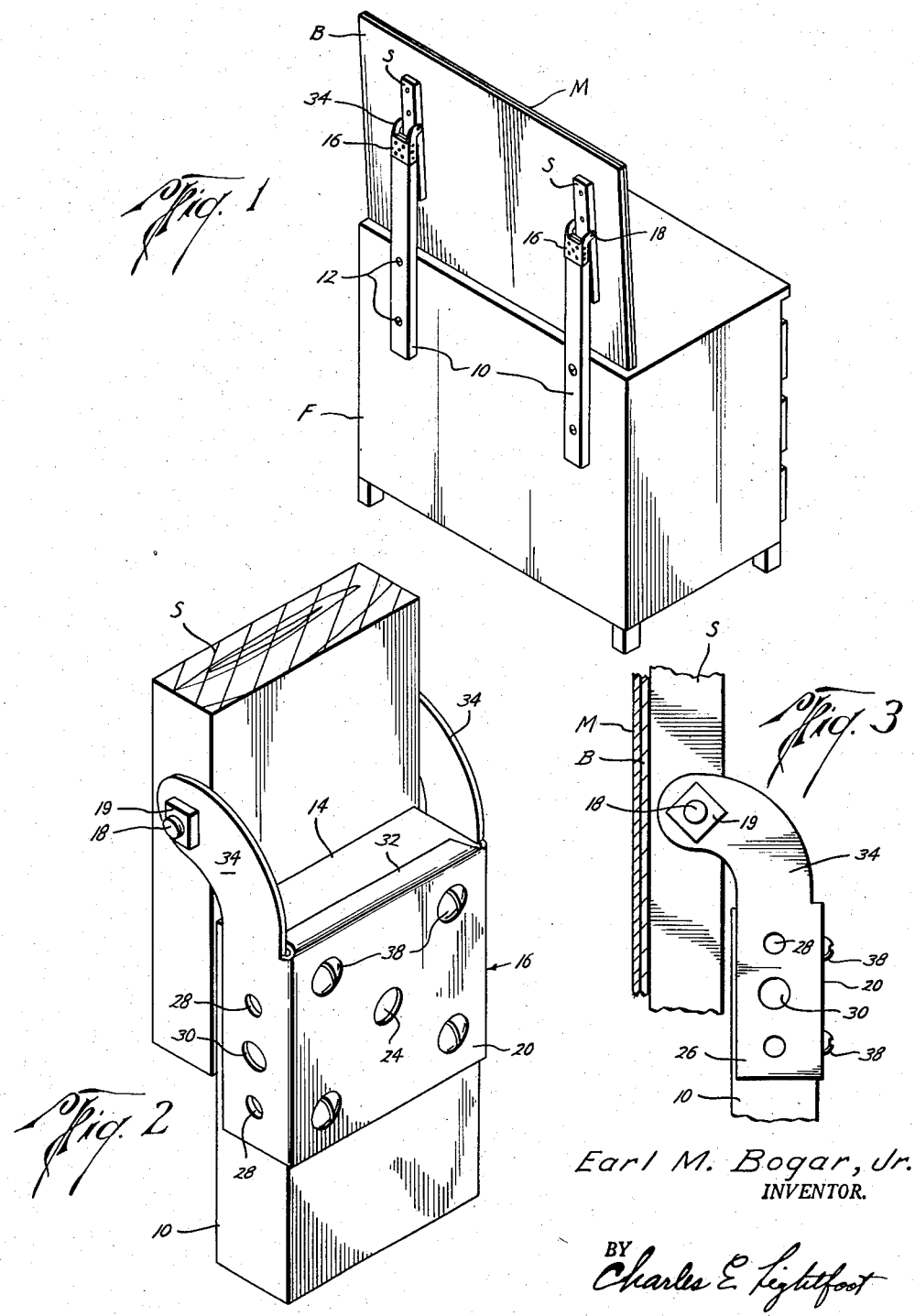

2,874,613

SUPPORT FOR TILTING MIRRORS

Earl M. Bogar, Jr., Houston, Tex.

Application April 5, 1956, Serial No. 576,368

1 Claim. (Cl. 88—99)

This invention relates to a support for tilting mirrors, and more particularly to a device for connecting a mirror to a dresser, bureau, or other article of furniture to support the mirror above such article for vertical tilting movement.

As commonly constructed, articles of furniture such as vanities, dressers, bureaus and the like are provided with mirrors which are usually disposed along the rear edge of the furniture and positioned somewhat above the same in a generally upright position for vertical tilting movement. Such mirrors are often attached to the furniture by means of uprights secured to the back of the furniture and extending upwardly along the back of the mirror and secured thereto by pivotal connections, whereby the mirror may be tilted vertically to adjust the view which is obtainable.

In shipping articles of furniture of this kind the mirrors are removed and packed separately, both because of the likelihood that they may become broken and for the purpose of conserving space. The removal and replacement of the mirrors presents a task requiring considerable skill and the expenditure of much time and labor, thereby becoming a substantial item of expense.

It is also a common practice to provide mirrors for this purpose with a backing of some suitable material, such as Masonite or other composition such as compressed wood, fibre board, or the like, to which the mirror supporting means must be attached. Such materials possess the disadvantage that they cannot readily be used with ordinary fastening means, such as wood screws, which do not hold well in such backings, so that it becomes necessary to provide some other type of fastening means.

In mirrors of the tilting type the means by which the mirror is supported for vertical tilting usually includes a screw threaded bolt by which the parts of the mirror support are pivotally connected together, and connections of this kind are subject to becoming loosened due to repeated tilting movements of the mirror, which tend to cause unscrewing of the fastening.

The present invention has for an important object the provision of a mirror support for tilting mirrors, by the use of which the tendency of the fastening means to become loosened from repeated tilting movements of the mirror is prevented and whereby the parts may be adjusted to securely hold the mirror in any position to which it is tilted.

Another object of the invention is to provide a mirror support which is easily applied to a mirror having a backing formed of Masonite, fibre board, or other material which does not readily hold wood screws.

Another object of the invention is to provide a mirror support which is of simple design and rugged construction, and which may be cheaply manufactured.

The above and other important objects and advantages of the invention may best be understood from the following detailed description, constituting a specification of the same, when considered in conjunction with the annexed drawings, wherein:

Figure 1 is a perspective view illustrating a preferred embodiment of the invention applied to a mirror and an article of furniture, and showing the manner in which the invention functions;

Figure 2 is a fragmentary perspective view, on an enlarged scale, showing the mirror attaching part of the invention, and the manner by which the same is pivotally mounted to support the mirror in position for tilting movement;

Figure 3 is a side elevational view of the invention as illustrated in Figure 2, showing the same attached to a mirror.

Referring now to the drawings in greater detail, the mirror support of the invention includes an upright or standard 10, several of which may be employed, and which may conveniently be formed of wood and attached to the back of an article of furniture F, such as a dresser, as by means of wood screws 12, the standards being positioned vertically, with their upper ends extending above the article of furniture.

The invention is particularly useful in connection with a mirror M, provided with a backing B of Masonite, fibre board, or other like material, to which vertically extending wooden slats S are attached in any suitable manner. The uprights 10 are each hingedly secured to one of the slats S by hinge elements 16, which are pivotally attached to the slats, as by means of threaded hinge bolts 18, provided with nuts 19, threaded thereon in the usual manner. The hinge elements 16 are preferably formed of sheet metal, and are of channel shape in cross-section, having a bottom wall 20, provided with suitably located perforations, to receive fastening means, such as the screws 38, by which the hinge element is secured to the upper end of the slat, and a central opening 24, for a purpose to be more fully explained hereinafter, and side walls 26, provided with suitably located openings 28 through which screws may be extended, and with additional openings 30 for a purpose later to be pointed out. The bottom wall 20 may have an inturned upper end marginal portion 32, forming an abutment and reinforcing flange, and the side walls 26 are extended longitudinally beyond the flange 32, as indicated at 34, the extended portions being perforated to receive the bolt 18, which also extends through an opening in the slat S to which the hinge element is pivotally secured.

In applying the hinge members 16; the extending portions 34 are pivotally connected to the slat S by the bolt 18, which extends through an opening in the slat and through the perforations in the extending portions 34, so that when the nut 19 is tightened the bolt 18 will rotate with the hinge element, whereby loosening of the nut is prevented. The hinge element is applied to the upright 10 with the upper end flange 32 extending over and in abutting engagement with the upper end 14 of the upright, and may be secured to the upright by means of screws 38, extending through the perforations in the bottom wall.

The openings 30 in the side walls 26 are provided to receive a bolt, or other fastening, should it be desired to employ the same for connecting the hinge element to an upright or block, and the opening 24 in the bottom wall 20 is provided for a like purpose.

It will thus be apparent that the invention, constructed as described above provides a mirror support which is easily applied, and by which a mirror may be mounted for tilting movement while at the same time loosening of the pivotal connection due to repeated tilting movements of the mirror is prevented.

The invention has been disclosed herein in connection with certain specific embodiments of the same, but it will be understood that this is intended by way of illustration only, and that numerous changes can be made in the construction and arrangement of the parts without departing from the spirit of the invention or the scope of the appended claim.

Having thus clearly shown and described the invention, what is claimed as new and desired to secure by Letters Patent is:

The combination with a mirror and an elongated standard adapted to be secured in an upright position to an article of furniture with the upper end of the standard extending above the article; of a channel shaped connector element, having side walls positioned vertically rearwardly of the mirror on opposite sides of the upper end portion of said standard and at right angles to the plane of the mirror when the mirror is in an upright position and whose bottom wall is formed with a portion extending between said side walls in position for engagement with the top of the standard, said side walls having end portions which are curved away from said bottom wall in the same direction in which the side walls extend from said bottom wall and means forming a pivotal connection between said end portions and said mirror to support the mirror for vertical tilting movement about an axis parallel to and spaced from said bottom wall.

References Cited in the file of this patent

UNITED STATES PATENTS

| | | |
|---|---|---|
| 385,305 | Harrison | June 26, 1888 |
| 1,344,479 | Bradley | June 22, 1920 |
| 1,422,651 | Baxter | July 11, 1922 |
| 2,136,141 | Loftin et al. | Nov. 8, 1938 |